(No Model.)
J. R. NUNNS & F. M. CLOUGH.
Water Gage.
No. 231,350. Patented Aug. 17, 1880.
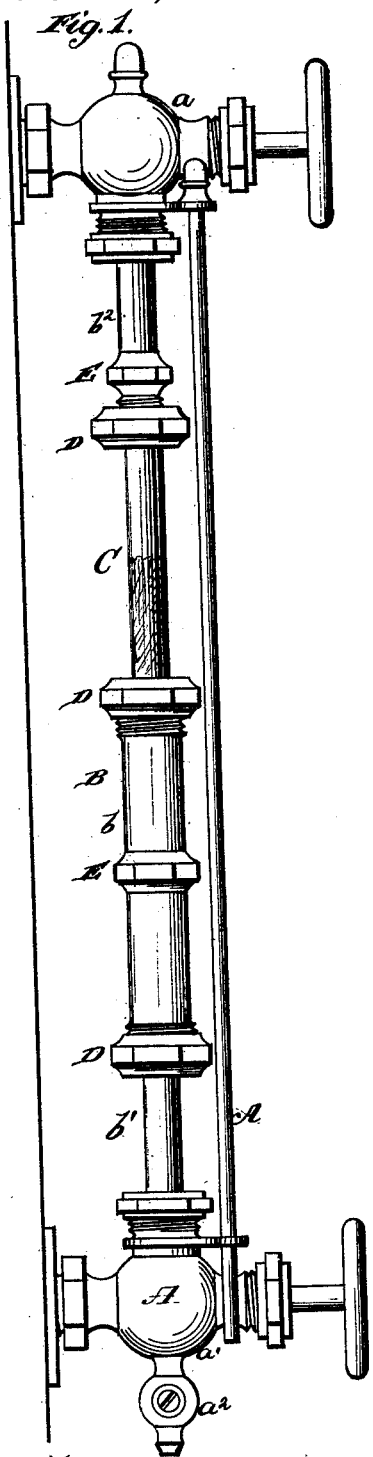
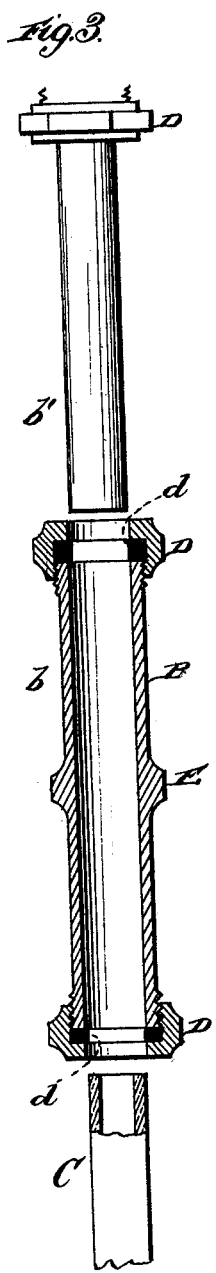
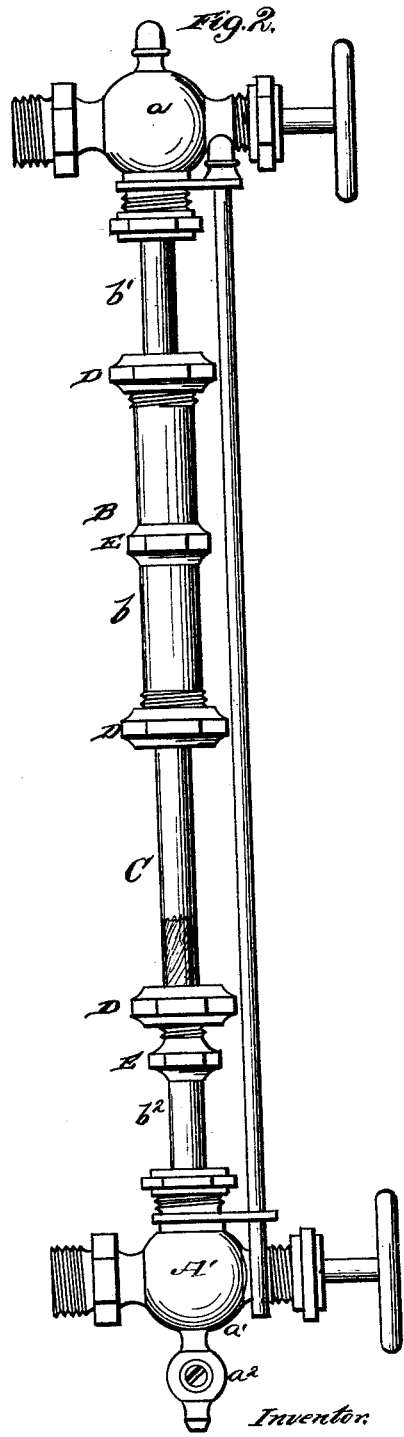
Witnesses:
Robt Everett
N. W. Stearns.
Inventor:
John R. Nunns
and
Fred'k M. Clough
by W H Babcock
Attorney

UNITED STATES PATENT OFFICE.

JOHN R. NUNNS AND FREDERICK M. CLOUGH, OF WEST CHESHIRE, CONN.

WATER-GAGE.

SPECIFICATION forming part of Letters Patent No. 231,350, dated August 17, 1880.

Application filed March 17, 1880. (No model.)

*To all whom it may concern:*

Be it known that we, JOHN R. NUNNS and FREDERICK M. CLOUGH, citizens of the United States, residing at West Cheshire, in the county of New Haven and State of Connecticut, have invented certain new and useful Improvements in Water-Glasses for Boilers; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to water-glasses or tubular indicators for showing the height of water in boilers.

The object of said invention is to allow broken glass tubes, however short, to be used as such indicators, and to provide for shifting them into positions corresponding approximately with the desired level of the water. This object is accomplished by means hereinafter more particularly set forth and claimed.

In the accompanying drawings, Figure 1 represents a side elevation of our improved device and the parts to which it is attached. Fig. 2 represents a similar view with the glass tube shifted into a lower position, and Fig. 3 represents our extensible tube in detail, the parts being slightly separated.

A A' designate two hollow holders of ordinary construction, which are provided with cocks $a$ $a'$ and a suitable outlet, $a^2$.

There is nothing new in the construction of the foregoing parts. They have long been used to hold the water-glass or tubular indicator attached to steam-generating boilers and allowing the ingress of water to the same, so that its height in the boiler can be readily ascertained.

Such water-glasses have hitherto generally been made of a continuous glass tube extending from holder to holder. The length, brittleness, and exposed position of a tube thus constructed render it very liable to fracture, in which case it becomes useless and the boiler remains without a water-indicator until a new glass can be obtained. To avoid the obvious inconveniences of such a delay we have invented a sectional extensible metallic tube, which may be used with any length of glass.

This extensible tube is designated as a whole by the letter B, and fills the entire space between the holders A A', to which it is detachably connected by nuts working on screw-threads and recessed to form stuffing-boxes for containing rings of suitable packing. This tube B consists of a series of tubular sections, $b$ $b'$ $b^2$, the positions of which may be mutually interchanged, and which are connected to one another and to the glass tube C by nuts D, which form stuffing-boxes for containing suitable packing-rings $d$. The interior of each metallic tube $b$ $b'$ $b^2$ is made of such diameter that it will admit the end of the glass tube C, but will hold it tightly in place, and the same is true of the interior of the holders A A'. The packing in the stuffing-boxes also fits tightly on the said glass tube.

It is obvious that the glass tube may be very short, so that in case of fracture any little fragment can be utilized instead of the whole tube, the sections $b$ $b'$ being extended by the action of the stuffing-box nuts until both ends of the shortened glass are firmly held.

When a short glass is used, it is obviously desirable to have it placed at that part of the tube which corresponds with the level of the water-line in the boiler; but this point varies. Sometimes a low level of water is required, sometimes a high one. Hence the position of the glass C is made variable at will.

By uncoupling the sections $b$ $b'$ $b^2$ the glass may be removed and transferred to another position above or below the previous one. The number of such possible changes will depend on the number of sections used. We have shown three sections, which will allow several shiftings of the glass; but a greater number of sections could be employed. By our arrangement, as shown, however, the glass may be made to extend over or across any level which may be desired.

We provide each section with a fixed nut or holding-piece, E, whereby said section may be firmly held while one end is being coupled, so as to prevent the uncoupling of the other end and the loosening of the stuffing-boxes. More than one piece of glass may be used in this tube at the same time.

Having thus fully described our invention, what we claim as new, and desire to secure by Letters Patent, is—

1. A boiler-indicator consisting of tubular extensible metallic sections and one or more glass tubes held therein, whereby the fragment or fragments of a water-glass may be utilized, as set forth.

2. A boiler-indicator consisting of mutually-interchangeable metallic sections and a glass section, whereby said glass section may be shifted to an upper or lower position at will.

3. Sections $b\ b'\ b^2$, provided with fixed nuts or grasping-pieces E, in combination with glass tube C and nuts and stuffing-boxes, substantially as set forth.

In testimony whereof we affix our signatures in presence of two witnesses.

JOHN R. NUNNS.
FREDERICK M. CLOUGH.

Witnesses:
EUNICE B. CORNWALL,
CORNELIA A. CORNWELL.